(12) United States Patent
Conklin et al.

(10) Patent No.: US 6,665,534 B1
(45) Date of Patent: Dec. 16, 2003

(54) PRIORITY INCOMING CALL ALERTING SYSTEM FOR A WIRELESS COMMUNICATION SYSTEM

(75) Inventors: Stuart D. Conklin, Basking Ridge, NJ (US); Wilfred E. Lehder, Jr., Rumson, NJ (US); Gary L. Griffith, Arvada, CO (US)

(73) Assignee: Avaya Inc., Lincroft, NJ (US)

( * ) Notice: Subject to any disclaimer, the term of this patent is extended or adjusted under 35 U.S.C. 154(b) by 0 days.

(21) Appl. No.: 09/420,166

(22) Filed: Oct. 18, 1999

(51) Int. Cl.[7] ................................................ H04M 3/42
(52) U.S. Cl. ...................... 455/417; 455/456.1; 455/527
(58) Field of Search ................................. 455/414, 417, 455/445, 461, 466, 406, 404, 422, 440, 412, 450, 457, 456.1, 527

(56) References Cited

U.S. PATENT DOCUMENTS

| | | | | |
|---|---|---|---|---|
| 5,179,374 A | * | 1/1993 | Winger | 455/440 |
| 5,600,704 A | * | 2/1997 | Ahlberg et al. | 455/445 |
| 5,678,179 A | * | 10/1997 | Turcotte et al. | 455/466 |
| 5,778,304 A | * | 7/1998 | Grube et al. | 455/422 |
| 5,852,779 A | * | 12/1998 | Sawyer | 455/445 |
| 5,930,700 A | * | 7/1999 | Pepper et al. | 455/414 |
| 5,946,611 A | * | 8/1999 | Dennison et al. | 455/404 |
| 6,115,602 A | * | 9/2000 | Dee et al. | 455/406 |
| 6,119,014 A | * | 9/2000 | Alperovich et al. | 455/466 |
| 6,198,931 B1 | * | 3/2001 | Smith et al. | 455/445 |
| 6,320,534 B1 | * | 11/2001 | Goss | 342/357.1 |

* cited by examiner

Primary Examiner—Nguyen T. Vo
Assistant Examiner—H. Nguyen
(74) Attorney, Agent, or Firm—Patton Boggs LLP

(57) ABSTRACT

The priority incoming call alerting system for a wireless communication system functions to automatically identify the subscriber's need for privacy in terms of the present location of a wireless subscriber or the subscriber's manually indicated preference, and process incoming calls as a function of this desired privacy and the priority of the incoming call. This is accomplished by providing a wireless communication system with a priority incoming call alerting system that includes call priority identification apparatus and optionally subscriber location identifying apparatus to thereby enable the wireless communication system to automatically screen incoming calls that are directed to the wireless subscriber and only alert the subscriber of the presence of a priority incoming call from a calling party, yet routes all non-priority calls to a call coverage point. The priority incoming call alerting system functions to identify various locales in which the call alerting system should be automatically activated and incoming calls to a subscriber's wireless communication device are not processed unless the incoming call has assigned thereto a predetermined priority. The activation of this capability can be effected in numerous ways, including the use of a low power infrared transmitter located in the selected privacy environments which activate the subscriber's wireless communication device to enter the call screening mode. This mode setting can also be accomplished by the wireless subscriber manually activating the wireless communication device to select this call screening feature.

18 Claims, 3 Drawing Sheets

FIG. 3

| WIRELESS STATION | 12-0 | 12-1 | xxx | 12-n |
|---|---|---|---|---|
| SUBSCRIBER | MIKE SIMMS | LINDA SOU | | KEITH LINK |
| LOCATION | PATIENT ROOM 301A | HALL - 4TH FLOOR | | CONFERENCE A |
| PRIVACY LEVEL/PRIORITY THRESHOLD | 4 | 1 | | 3 |
| CALLING PARTY | 11-0 | 11-7 | | (703) 555-1356 |
| CALL PRIORITY | 3 | 4 | | 3 |
| LISTED CALLING PARTIES | 11-0<br>11-4<br>(703) 565-0909<br>(703) 305-0010 | 11-0 | | 11-4<br>(970) 109-2321 |

PRIORITY INCOMING CALL ALERTING SYSTEM FOR A WIRELESS COMMUNICATION SYSTEM

FIELD OF THE INVENTION

This invention relates to wireless communication systems and, in particular, to a priority incoming call alerting system that automatically alerts the wireless subscriber of the presence of a priority incoming call from a calling party, yet routes all non-priority calls to a call coverage point, with the priority incoming call alerting feature being either activated as a function of the location of the subscriber or manually activated by the subscriber.

PROBLEM

It is a problem in communication systems, such as wireless communication systems, to provide the wireless subscriber with an indication of the presence of a priority incoming call from a calling party, where this call screening function is activated as a function of the present activity or location of the subscriber. Existing wireless communication systems process each incoming call to completion regardless of the level of importance of the incoming call or the present location or activity of the subscriber. A significant problem with this operation is that the subscriber, who is awaiting receipt of an important incoming call, must either manually screen all incoming calls to identify the priority of the incoming call or make use of a secretarial call screening service to identify the priority incoming call.

The use of a secretarial call screening service requires that the incoming call be answered and screened by the staff of the secretarial call screening service to identify a priority level for the incoming call. The secretarial service must then determine whether this incoming call should be immediately forwarded to the subscriber, based on the instructions of the subscriber. If so, the secretarial call screening service records a message to identify the calling party, the nature of the calling party's request, the calling party's telephone number and then forwards a message to the subscriber, typically via a pager, and the subscriber must return the received call. This process is inefficient, time consuming, and prone to errors in the message transcription and relaying functions. This process also cannot track the changing location and/or activities of the subscriber and the associated change in the privacy needs of the subscriber.

The subscriber manual call screening option is equally undesirable in that the wireless subscriber is interrupted by every incoming call, even when the wireless subscriber is engaged in an activity that takes priority over the incoming call, or the interruption is socially inappropriate. Thus, wireless subscribers should not be interrupted when they are located in a place of worship, restaurants, movie theaters, engaged in important meetings, and the like. For example, when a physician is in conference with a patient in a hospital room, the physician should not be interrupted by an incoming call on their wireless communication device unless the physician needs to be available to receive an emergency call. However, existing wireless communication systems cannot identify the present location and/or activities of a wireless subscriber in terms of the subscriber's need for privacy, and process incoming calls as a function of this desired privacy in view of the priority of the incoming call.

SOLUTION

The above described problems are solved and a technical advance achieved in the field by the present priority incoming call alerting system for a wireless communication system that functions to automatically identify the subscriber's need for privacy in terms of the present location of a wireless subscriber or the subscriber's manually indicated preference, and process incoming calls as a function of this desired privacy and the priority of the incoming call.

This is accomplished by providing a wireless communication system with a priority incoming call alerting system that includes call priority identification apparatus and optionally subscriber location identifying apparatus to thereby enable the wireless communication system to automatically screen incoming calls that are directed to the wireless subscriber and only alert the subscriber of the presence of a priority incoming call from a calling party, yet routes all non-priority calls to a call coverage point. The present description uses a hospital based wireless communication system as a well known example of a communication environment in which the present priority incoming call alerting system is operational. The priority incoming call alerting system functions to identify various locales in the hospital environs in which the call alerting system should be automatically activated. In particular, patient rooms, operating rooms, and the like can be designated as privacy environments in which incoming calls to a subscriber's wireless communication device are not processed unless the incoming call has assigned thereto a predetermined priority. The activation of this capability can be effected in numerous ways, including the use of a low power infrared transmitter located in the selected privacy environments which activate the subscriber's wireless communication device to enter the call screening mode. This mode setting can also be accomplished by the wireless subscriber manually activating the wireless communication device to select this call screening feature. The activation of this call screening feature is transmitted to the wireless communication system so that incoming calls directed to that wireless communication device can be screened for the appropriate priority level.

BRIEF DESCRIPTION OF THE DRAWING

FIG. 3 illustrates a typical data record structure used in the present priority incoming call alerting system.

DETAILED DESCRIPTION

Figure 1:
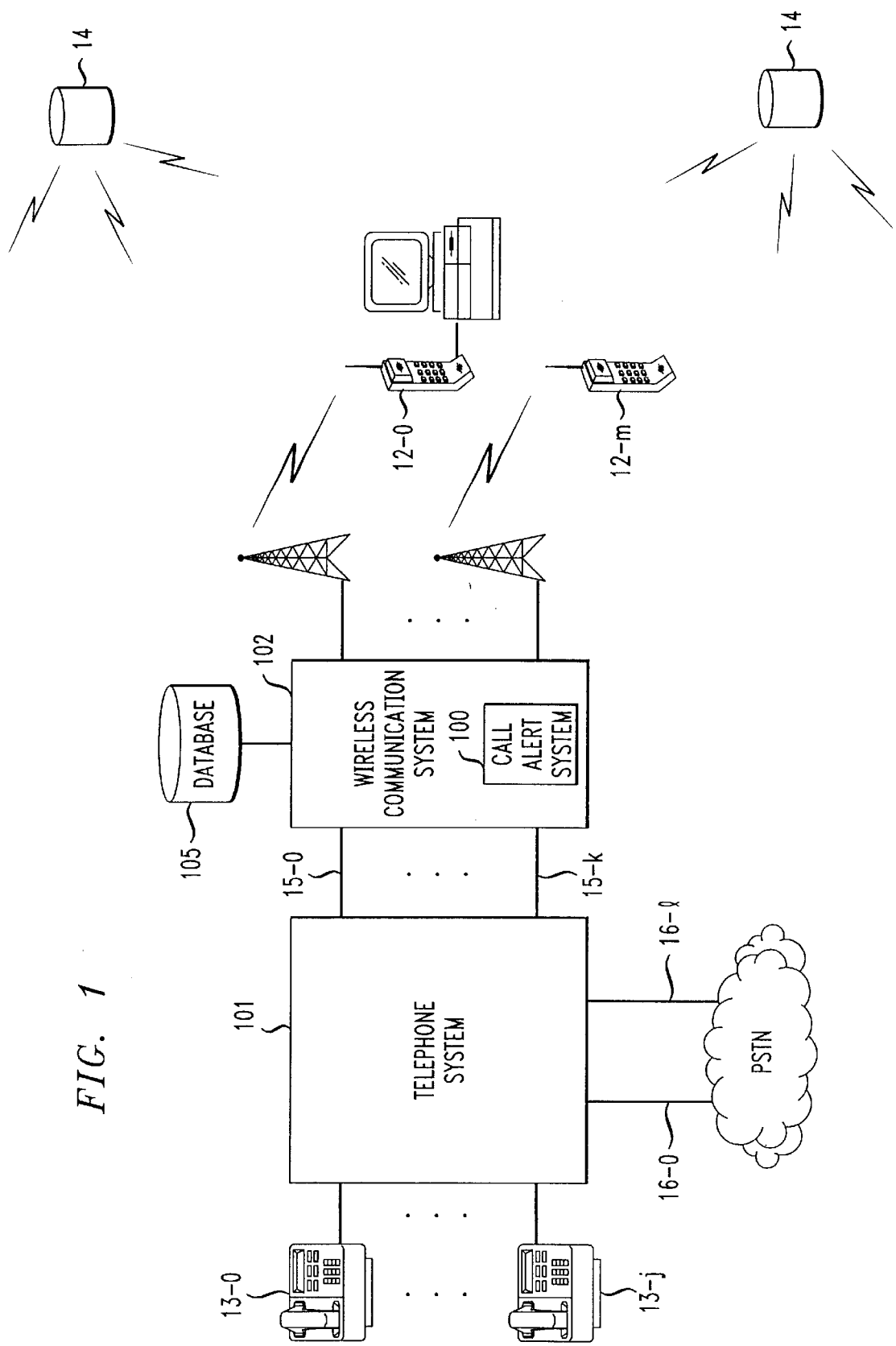
FIG. 1 illustrates in block diagram form the overall architecture of the present priority incoming call alerting system as implemented in a wireless communication system.
Figure 2:
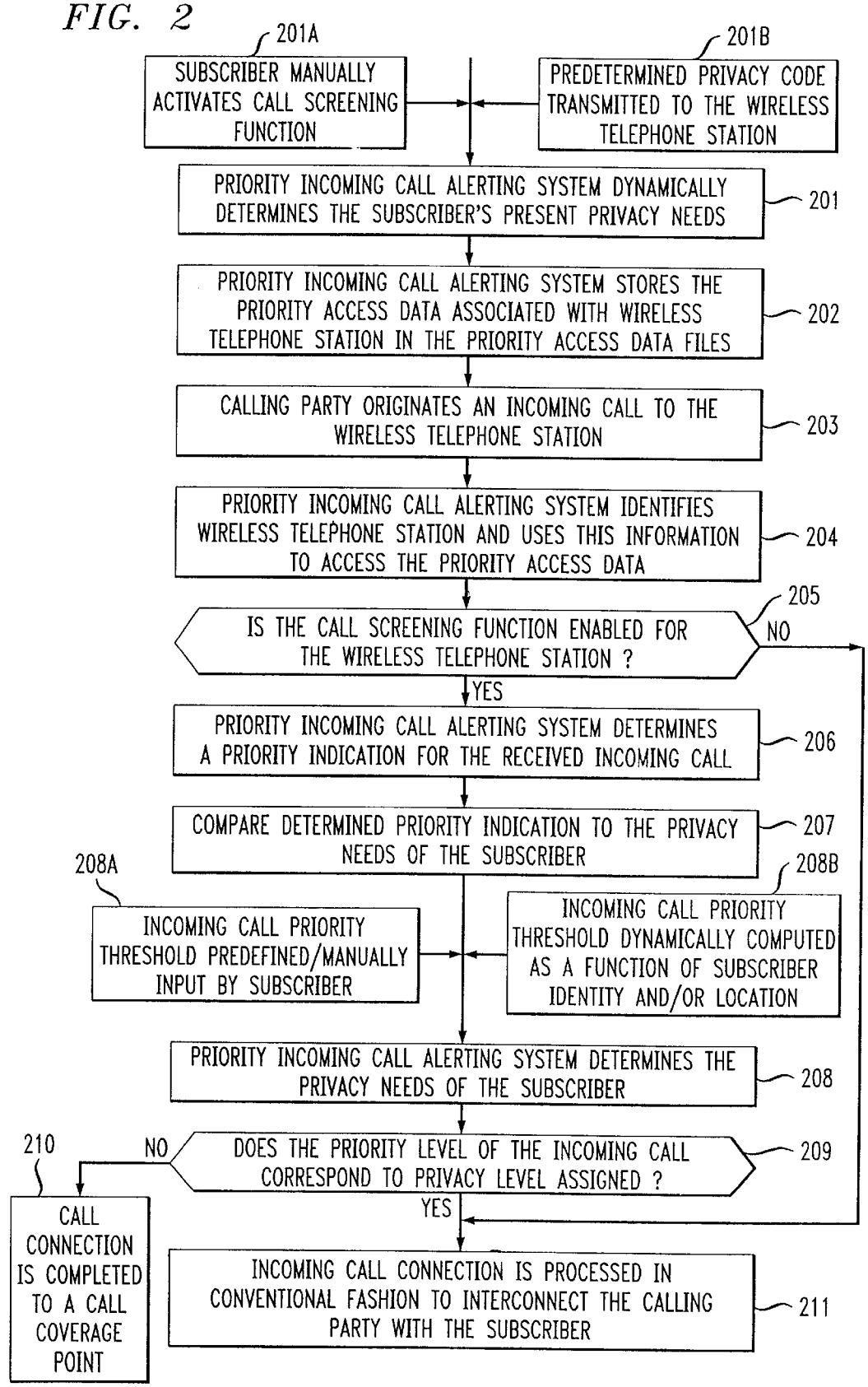
FIG. 2 illustrates in flow diagram form the operational steps taken by the present priority incoming call alerting system to process an incoming call connection in a wireless communication system.

FIG. 1 illustrates in block diagram form the overall architecture of the present priority incoming call alerting system, and FIG. 2 illustrates in flow diagram form the operational steps taken by the present priority incoming call alerting system to process an incoming call connection. In particular, a wireless communication system is equipped with a priority incoming call alerting system that includes call priority identification apparatus and optionally subscriber location identifying apparatus to thereby enable the wireless communication system to automatically screen incoming calls that are directed to the wireless subscriber and only alert the subscriber of the presence of a priority incoming call from a calling party, yet routes all non-priority calls to a call coverage point. The present description uses a hospital based wireless communication system as a well known example of a communication environment in which the present priority incoming call alerting system is operational. The priority incoming call alerting system functions to identify various locales in the hospital environs in which the call alerting system should be automatically activated. In particular, patient rooms, operating rooms, and the like can be designated as privacy environments in which incoming calls to a subscriber's wireless communication device are not processed unless the incoming call has assigned thereto a predetermined priority.

WIRELESS COMMUNICATION SYSTEM

The wireless communication system 100 serves to establish communication connections among a plurality of wireless communication devices 12-0 to 12-m and the communication trunks 15-0 to 15-k that serve to interconnect the wireless communication system 102 with a conventional telephone switching system 101, such as a Private Branch Exchange (PBX) system that serves a particular facility. The telephone switching system 101 serves to establish communication connections among the plurality of telephone station sets 13-0 to 13-j, communication trunks 15-0 to 15-k, and central office trunks 16-0 to 16-1 that connect the telephone switching system 101 to the Public Switched Telephone Network (PSTN). The operation of the wireless communication system 100 and the plurality of wireless communication devices 12-0 to 12-m that it serves is well known and not disclosed in detail herein. An alternative architecture is where the telephone switching system 101 that serves the wireless communication system 100 is a component of the Public Switched Telephone Network (PSTN).

As an example of the operation of a typical wireless communication system 100, a call connection is originated by a telephone subscriber 13-0 served by telephone switching system 101 and directed to a wireless telephone subscriber located at wireless telephone station 12-0. The telephone switching system 101 detects the call origination and identifies the wireless telephone station 12-0 used by the wireless telephone subscriber as the called party and the fact that wireless telephone station 12-0 is served by wireless communication system 100. Telephone switching system 101 processes the call origination in well known fashion to interconnect subscriber station 13-0 served by the telephone switching system 101 with wireless communication system 100 via a one of trunks 15-0. Wireless telephone system 100 uses the unique station set identification data stored in the wireless telephone station 12-0 to scan the data entries in the home location register HLR to verify the wireless telephone subscriber's authority to receive the requested call services. The wireless communication system 100, upon verifying the authorization of the wireless subscriber to obtain the requested services, then processes the incoming call connection from telephone switching system 101 in well known fashion to interconnect the wireless telephone subscriber with the calling part located at subscriber station 13-0.

OPERATION OF THE PRIORITY INCOMING CALL ALERTING SYSTEM

The operation of the priority incoming call alerting system 102 is illustrated in flow diagram form in FIG. 2 in the example of calling party located at subscriber station 13-0 originates a communication connection to the wireless communication system 100 to be interconnected with the subscriber located at wireless telephone station 12-0. The priority incoming call alerting system 102 maintains priority access data files stored in the data-storage devices 105 to identify the wireless telephone station 12-0 and associated call screening information. Typical data that can be used in various combinations to implement this call screening function for each of the wireless telephone stations 12-0 to 12-m served by the wireless communication system 100 are illustrated in FIG. 3, wherein the data can include: subscriber location, subscriber name, identity of the calling party, incoming call priority, incoming call priority threshold, a list of priority calling parties, and the like. The data that is selected to be used to perform the call screening function identify both the priority of the incoming call as well as the privacy needs of the subscriber located at the wireless telephone station 12-0.

The priority incoming call alerting system 102 at step 201 dynamically determines the present privacy needs of the subscriber located at the wireless telephone station 12-0. This can be accomplished in a number of ways. For example, the subscriber located at the wireless telephone station 12-0 can manually activate the call screening function at step 201 A by inputting a predetermined feature selection on wireless telephone station 12-0, which data is transmitted to wireless communication system 100 in the wireless communication control channel, thereby avoiding the need to establish a communication connection between the wireless telephone station 12-0 and the wireless communication system 100. Alternatively, priority incoming call alerting system 102 can derive the need for privacy from other data that is collected from wireless telephone station 12-0. For example, various locales in the building in which the subscriber located at the wireless telephone station 12-0 is presently located can be equipped with data transmission devices 14-0 to 14-n which broadcast a predetermined privacy code. The broadcast can be effected via infrared transmissions or other such wireless broadcast techniques to transmit the predetermined privacy code to the wireless telephone station 12-0 at step 201B. The predetermined privacy code includes a predetermined privacy level required for this locale and/or can include unique location identifying indicia to identify the present location of the subscriber located at the wireless telephone station 12-0. The unique location identifying indicia can be used to derive a privacy level for this subscriber and/or the locale, thereby avoiding the need to reprogram the data transmission devices 14-0 to 14-n as the use of the locale or the occupants therein change over time. The wireless telephone station 12-0, upon receipt of the predetermined privacy code, transmits the predetermined privacy code to priority incoming call alerting system 102 located in wireless communication system 100 via the control channel, thereby avoiding the need to establish a communication connection between the wireless telephone station 12-0 and the wireless communication system 100. The priority incoming call alerting system 102 at step 202 stores the priority access data associated with wireless telephone station 12-0 in the priority access data files on data storage devices 105 to maintain a present indication of the privacy needs of the subscriber located at the wireless telephone station 12-0.

At step 203, the calling party located at subscriber station 13-0 originates an incoming call to the wireless telephone station 12-0 served by the wireless communication system 100. In response to the receipt on an incoming call by the wireless communication system 100, the priority incoming call alerting system 102 identifies the wireless telephone station 12-0 at step 204 and uses this information to access the priority access data stored in the data storage devices 105. If there is no call screening function enabled for the wireless telephone station 12-0, as determined by the priority incoming call alerting system 102 at step 205, the incoming call connection is processed in conventional fashion to interconnect the calling party located at subscriber station 13-0 with the subscriber located at the wireless telephone station 12-0. If a call screening function is enabled, the priority incoming call alerting system 102 must identify the priority level of the incoming call to determine whether to complete this call or redirect this incoming call to a call coverage point which is assigned to this subscriber.

There are numerous methods of assigning a priority to the incoming call and several of these options are mentioned herein for the purpose of illustrating the operation of the priority incoming call alerting system 102, although there are numerous alternative methods of assigning a priority to the incoming call which are obvious to one of ordinary skill in the art but are not discussed herein for the sake of brevity of this description. In particular, the telephone switching system 101 can assign a priority to the incoming call, for example as a function of the identity of the calling party, and transmit this priority data to the wireless communication system 100 for use by the priority incoming call alerting system 102. Alternatively, the telephone switching system 101 can transmit data indicative of the identity of the calling party located at subscriber station 13-0 to the wireless communication system 100 for use by the priority incoming call alerting system 102. The calling party identify can be used to match this data with a list of predetermined calling party identification data stored in the priority access data, with an optional priority level indicia being associated with each such stored calling party identification. Regardless of the method used, the priority incoming call alerting system 102 at step 206 determines a priority indication for the received incoming call.

The determined priority indication is then compared by the priority incoming call alerting system 102 at step 207 to the privacy needs of the subscriber located at the wireless telephone station 12-0. The privacy needs can be defined using any of a number of methods and several of these options are mentioned herein for the purpose of illustrating the operation of the priority incoming call alerting system 102, although there are numerous alternative methods of determining the privacy needs of the subscriber located at the wireless telephone station 12-0 which are obvious to one of ordinary skill in the art but are not discussed herein for the sake of brevity of this description. In particular, the priority access data can include an incoming call priority threshold which is either predefined or manually input by the subscriber at step 208A. Alternatively the incoming call priority threshold can be dynamically computed by the priority incoming call alerting system 102 at step 208B as a function of the identity of the subscriber located at the wireless telephone station 12-0 and/or the present locale of the subscriber located at the wireless telephone station 12-0 as defined by the unique location identifying indicia stored in the priority access data for this subscriber.

As a result of the priority incoming call alerting system 102 determining the privacy needs of the subscriber located at the wireless telephone station 12-0, a comparison is made between the priority of the incoming call and the determined privacy needs at step 207. This comparison can be as simple as a direct numerical comparison between a priority level assigned to the incoming call and a privacy level (priority threshold) determined for this subscriber. If the priority level of the incoming call is at least as great as the privacy level assigned, then the incoming call connection is completed to the wireless telephone station 12-0 at step 209. If not, the incoming call connection is completed to a call coverage point at step 210, which can use the priority access data to provide an indication to the calling party that the subscriber is presently unavailable to receive the incoming call. The priority access data can provide the identify of the subscriber, present locale and the like to produce a detailed message to the calling party indicative of the present activity of the subscriber which requires privacy. The call coverage point can be subscriber specific and determined from the stored priority access data.

ADDITIONAL SYSTEM FEATURES

While a particular implementation of the priority incoming call alerting system for a wireless communication system has been disclosed, it is obvious that there are many other environments in which it is beneficial. Various locales in the public domain can maintain data transmission devices which can be used to automatically activate the call screening feature for wireless subscribers who are present within the confines of this locale. This enables the owner/operator of a particular establishment to define a level of privacy for the members of the public who frequent this locale, hereby avoiding the annoyance of incoming calls being completed to wireless subscribers who are present within the confines of this locale.

SUMMARY

The priority incoming call alerting system for a wireless communication system functions to automatically identify the subscriber's need for privacy in terms of the present location of a wireless subscriber or the subscriber's manually indicated preference, and process incoming calls as a function of this desired privacy and the priority of the incoming call.

What is claimed:

1. A priority incoming call alerting system for screening communication connections from a calling party to a wireless subscriber equipped with a wireless, telephone station which is served by a wireless communication system, comprising:

means, responsive to an incoming communication connection directed to said, wireless telephone station, for determining a priority of said incoming communication connection;

means for determining a privacy level assigned to a present physical location of said wireless telephone station, comprising at least one of:

means for storing data, received from said wireless telephone station, indicative of a privacy level assigned, exclusive of said subscriber, to said present physical location of said wireless telephone station;

means for determining a privacy level assigned to said present physical location of said wireless telephone station, from present physical location definition data received from said wireless telephone station, and pre-stored privacy definition data associated with said present physical location; and means, responsive to said determined priority of said incoming communication connection corresponding t said privacy level assigned to said determined present location of said wireless telephone station, for extending said incoming communication connection to said wireless telephone station.

2. The priority incoming call alerting system of claim 1 wherein said means for determining a priority of said incoming communication connection comprises:

means for storing calling party identification data.

3. The priority incoming call alerting system of claim 2 wherein said means for determining a privacy level comprises:

means for storing data indicative of an identification of said wireless telephone station; and means for storing data indicative of an authorized calling party identification list.

4. The priority incoming call alerting system of claim 3 wherein said means for extending said incoming communication connection comprises:

means for comparing said stored calling party identification data with said stored data indicative of an authorized calling party identification list; and means, responsive to a match between said stored calling party identification data and said stored data indicative of an authorized calling party identification list, for enabling said wireless communication system to extend said incoming call connection to said wireless subscriber station.

5. The priority incoming call alerting system of claim 3, wherein said authorized calling party identification list includes priority data assigned to said calling party who is identified in said authorized calling party identification list, said means for extending said incoming communication connection comprises:

means for comparing said stored calling party identification data with said stored data indicative of an authorized calling party identification list; and means, responsive to a match between said stored calling party identification data and said stored data indicative of an authorized calling party identification list and a correspondence between said determined privacy level and said priority data assigned to said calling party, for enabling said wireless communication system to extend said incoming call connection to said wireless subscriber station.

6. The priority incoming call alerting system of claim 1 wherein said means for determining a priority of said incoming communication connection further comprises:

means for storing data, received from a communication system which has originated said incoming communication connection, indicative of a priority of said incoming communication connection.

7. The priority incoming call alerting system of claim 1 further comprising: means, responsive to said determined priority of said incoming communication connection failing to correspond to said privacy level assigned to said wireless subscriber, for extending said incoming communication connection to a call coverage point for said wireless telephone station.

8. A method of providing priority incoming call alerting for screening communication connections from a calling party to a wireless subscriber equipped with a wireless telephone station which is served by a wireless communication system, comprising the steps of:

determining, in response to an incoming communication connection directed to said wireless telephone station, a priority of said incoming communication connection;

determining a privacy level assigned to a present physical location of said wireless telephone station, comprising at least one of:

storing data, received from said wireless telephone station, indicative of a privacy level assigned, exclusive of said subscriber, to said present physical location of said wireless telephone station;

determining a privacy level assigned to said present physical location of said wireless telephone station, from present physical location definition data received from said wireless telephone station, and pre-stored privacy definition data associated with said present physical location;and extending, in response to said determined priority of said incoming communication connection corresponds to said privacy level assigned to said determined present location of said wireless telephone station, said incoming communication connection to said wireless telephone station.

9. The method of providing priority incoming call alerting system of claim 8, wherein said step of determining a priority of said incoming communication connection comprises:

storing calling party identification data in a memory.

10. The method of providing priority incoming call alerting system of claim 9 wherein said step of determining a privacy level comprises:

storing data indicative of an identification of said wireless telephone station in a memory; and storing data indicative of an authorized calling party identification list in a memory.

11. The method of providing priority incoming call alerting system of claim 10 wherein said step of extending said incoming communication connection comprises:

comparing said stored calling party identification data with said stored data indicative of an authorized calling party identification list; and enabling, in response to a match between said stored calling party identification data and said stored data indicative of an authorized calling party identification list, said wireless communication system to extend said incoming call connection to said wireless subscriber station.

12. The method of providing priority incoming call alerting system of claim 10, wherein said authorized calling party identification list includes priority data assigned to said calling party who is identified in said list, said step of extending said incoming communication connection comprises:

comparing said stored calling party identification data with said stored data indicative of an authorized calling party identification list; and enabling, in response to a match between said stored calling party identification data and said stored data indicative of an authorized calling party identification list and a correspondence between said determined privacy level and said priority data assigned to said calling party, said wireless communication system to extend said incoming call connection to said wireless subscriber station.

13. The method of providing priority incoming call alerting system of claim 8 wherein said step of determining a priority of said incoming communication connection further comprises:

storing data, received from a communication system which has originated said incoming communication connection, indicative of a priority of said incoming communication connection in a memory.

14. The method of providing priority incoming call alerting system of claim 8, further comprising:

extending, in response to said determined priority of said incoming communication connection failing to correspond to said privacy level assigned to said wireless subscriber, said incoming communication connection to a call coverage point for said wireless telephone station.

15. A priority incoming call alerting system for screening communication connections from a calling party to a wireless subscriber equipped with a wireless telephone station which is served by a wireless communication system, comprising:

incoming call priority determining means, responsive to an incoming communication connection directed to said wireless telephone station, for determining a priority of said incoming communication connection;

means for determining a privacy level assigned to a present physical location of said wireless telephone station, comprising at least of:

site privacy definition means for storing data, received from said wireless telephone station, indicative of a privacy level assigned, exclusive of said subscriber, to said present physical location of said wireless telephone station;

site privacy determining means for determining a privacy level assigned to said present physical location of said wireless telephone station, from present physical location definition data received from said wireless telephone station, and pre-stored privacy definition data associated with said present physical location;

call screening means, responsive to said determined priority of said incoming communication connection corresponding to said privacy level assigned to said determined present location of said wireless telephone station, for extending said incoming communication connection to said wireless telephone station; and call redirecting means, responsive to said determined priority of said incoming communication connection failing to correspond to said privacy level assigned to said wireless subscriber, for extending said incoming communication connection to a call coverage point for said wireless telephone station.

16. The priority incoming call alerting system of claim 15 comprising:

wherein said incoming-call priority determining means comprises: means for storing at least one of: calling party identification data, and data received from a communication system which has originated said incoming communication connection, indicative of a priority of said incoming communication connection wherein said subscriber privacy means comprises: subscriber identification means for storing data indicative of at least one of: an identification of said wireless telephone station, and a present location of said wireless telephone station.

17. The priority incoming call alerting system of claim 16 further comprising:

wherein said subscriber privacy means further comprises: means for storing data indicative of an authorized calling party identification list; and wherein said call screening means comprises:

means for comparing said stored calling party identification data with said stored data indicative of an authorized calling party identification list; and means, responsive to a match between said stored calling party identification data and said stored data indicative of an authorized calling party identification list, for enabling said wireless communication system to extend said incoming call connection to said wireless subscriber station.

18. The priority incoming call alerting system of claim 16 further comprising:

wherein said subscriber privacy means further comprises: means for storing data indicative of an authorized calling party identification list and includes priority data assigned to said calling party who is identified in said authorized calling party identification list; and wherein said call screening means comprises:

means for comparing said stored calling party identification data with said stored data indicative of an authorized calling party identification list; and means, responsive to a match between said stored calling party identification data and said stored data indicative of an authorized calling party identification list and a correspondence between said determined privacy level and said priority data assigned to said calling party, for enabling said wireless communication system to extend said incoming call connection to said wireless subscriber station.

* * * * *